US012172287B2

(12) United States Patent
Moore

(10) Patent No.: US 12,172,287 B2
(45) Date of Patent: Dec. 24, 2024

(54) HYDRAULIC HAMMER WITH DAMPENING ACCUMULATOR

(71) Applicant: Caterpillar Inc., Peoria, IL (US)

(72) Inventor: Cody T. Moore, Robinson, TX (US)

(73) Assignee: Caterpillar Inc., Peoria, IL (US)

( * ) Notice: Subject to any disclaimer, the term of this patent is extended or adjusted under 35 U.S.C. 154(b) by 82 days.

(21) Appl. No.: 18/194,392

(22) Filed: Mar. 31, 2023

(65) Prior Publication Data

US 2024/0326212 A1 Oct. 3, 2024

(51) Int. Cl.
*B25D 9/14* (2006.01)
*E02F 3/96* (2006.01)

(52) U.S. Cl.
CPC ........ *B25D 9/145* (2013.01); *B25D 2209/002* (2013.01); *E02F 3/964* (2013.01); *E02F 3/966* (2013.01)

(58) Field of Classification Search
CPC .......................... B25D 9/145; B25D 2209/002
See application file for complete search history.

(56) References Cited

U.S. PATENT DOCUMENTS 7,156,190 B2 1/2007 Ottestad et al.
7,478,648 B2 * 1/2009 Lundgren .............. B25D 9/145 175/417
9,308,635 B2 4/2016 Moore
10,570,930 B2 2/2020 Robson
2007/0199724 A1 8/2007 Lundgren
2014/0020920 A1 * 1/2014 Tang ...................... B25D 9/145 173/90
2014/0209340 A1 7/2014 Moore
2014/0262406 A1 * 9/2014 Moore ...................... B25D 9/20 173/208
2014/0262407 A1 * 9/2014 Moore ...................... B25D 9/04 173/208
2016/0039079 A1 * 2/2016 Moore ...................... B25D 9/12 91/5
2017/0080554 A1 * 3/2017 Moore ..................... E02F 3/966
2017/0087703 A1 3/2017 Moore
2017/0138376 A1 * 5/2017 Moore ..................... F16F 9/082
2018/0133882 A1 * 5/2018 Moore ...................... B25D 9/12

FOREIGN PATENT DOCUMENTS

CN 2078633182 U 3/2019
CN 112746638 A 5/2021
EP 3550081 A1 10/2019
KR 10-1465059 B1 11/2014
WO WO 2016/052943 A1 4/2016

OTHER PUBLICATIONS

Written Opinion and International Search Report for Int'l. Patent Appln. No.PCT/US2024/014709, mailed May 15, 2024 (13 pgs).

* cited by examiner

*Primary Examiner* — Praachi M Pathak

(57) ABSTRACT

A hydraulic hammer for impact fracturing a work object includes a hammer shell having a cylinder body disposed between a front head and a rear head. A piston reciprocally movable within the cylinder body abut a work tool and can extend and retract the work tool from the hammer shell. To dampen momentum and impact forces, an accumulator head is attached to the back head and can accommodate hydraulic and dampening fluids in separate first and second sub-chambers. The dampening sub-chamber may directly fluidly communicate with an internal dampening fluid reservoir in the back head.

19 Claims, 4 Drawing Sheets

HYDRAULIC HAMMER WITH DAMPENING ACCUMULATOR

TECHNICAL FIELD

This patent disclosure is directed to a hydraulic hammer and, more particularly, to a hydraulic hammer having an accumulator chamber that can receive a dampening fluid to dampen impact forces generated by operation of the hydraulic hammer.

BACKGROUND

Hydraulic hammers are work tools that can be attached to various carrying machines or other structures like excavators, backhoes, fixed or stationary platforms, and other tool carriers for the purposes of milling or breaking up stone, concrete, and other construction materials. Hydraulic hammers convert the flow of pressurized hydraulic fluid into reciprocal motion of a work tool that can impart impact forces against an object such as a work structure or other surface. The repeated and abruptly applied impact forces are of a sufficient magnitude to fracture and break up the work object of interest. However, the impact forces may also be of a sufficient magnitude to vibrate and potentially damages the carrying machine or other structures within the vicinity of the hydraulic hammer. Moreover, the repeated exposure to the reciprocating impact forces may result in operator discomfort and disorientation over prolonged periods.

To dampen impact forces reacting on the carrying machine, the hydraulic hammer may include an impact system that dampens or absorbs the structural transfer of the impact forces through the carrying machine or other structure. For example, a simple solution may be to locate rubber or other elastic materials at the joints and connections between the hydraulic hammer and the carrying machine. Other solutions may utilize the force absorbing and fluid properties of a viscous fluid to provide active dampening of the impact forces. For example, U.S. Pat. No. 10,570,930 describes an accumulator configured for an impact hammer that utilizes a working gas to dampen impact forces generated by operation of the hammer. The present disclosure is similarly directed to improvements in the field of active force dampening for a hydraulic hammer by utilizing dampening fluids or gasses.

SUMMARY

The disclosure describes, in one aspect, a hydraulic hammer that includes a cylinder body disposed between a back head and a front head. Defined in part in the cylinder body is a cylinder bore extending along a hammer axis. A piston is reciprocally disposed within the cylinder bore for reciprocal movement along the hammer axis. The piston may be an elongated rod-shaped structure including a first piston end and a second piston end. The hydraulic hammer can also include a seal carrier disposed in the back head that is configured to receive the second piston end upon reciprocal movement of the piston along the hammer axis. To facilitate dampening of momentum and impact forces, an accumulator head can be attached to an axial rear end of the back head. The accumulator head defines an accumulator chamber with a membrane disposed therein separating the accumulator chamber between a hydraulic sub-chamber for accommodating a hydraulic fluid and a dampening sub-chamber for accommodating a dampening fluid. The dampening sub-chamber is axially proximate to and in fluid communication with the back head.

In another aspect, the disclosure describes a hydraulic hammer that includes a cylinder body disposed between a back head and a front head. Defined in part in the cylinder body is a cylinder bore extending along a hammer axis. A piston is reciprocally disposed with in the cylinder bore for reciprocal movement along the hammer axis. The piston is an elongated rod-shaped structure and can include a first piston end and a second piston end. To facilitate dampening of momentum and impact forces, an accumulator head can be attached to an axial rear end of the back head. The accumulator head defines an accumulator chamber with a membrane disposed therein that separate the accumulator chamber between a hydraulic sub-chamber for accommodating a hydraulic fluid and a dampening sub-chamber for accommodating a dampening fluid. The hydraulic hammer further includes an internal dampening fluid reservoir in the back head that is in direct fluid communication with the dampening sub-chamber disposed in the accumulator head.

DETAILED DESCRIPTION

Figure 1:
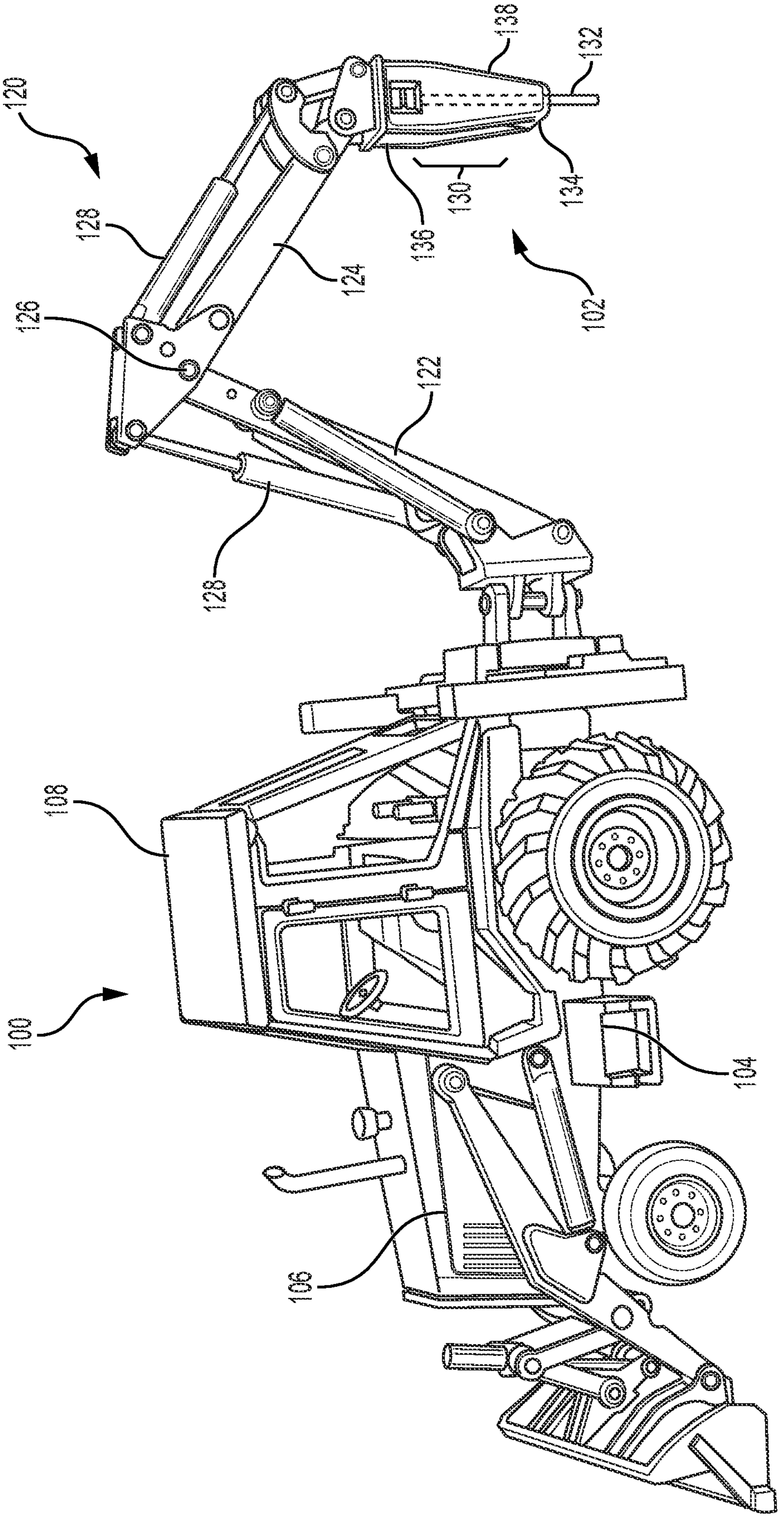
FIG. 1 is a top perspective view of a carrying machine equipped with a hydraulic hammer for fracturing and breaking apart material at a work site.

Now referring to the drawings, wherein whenever possible like reference numbers refer to like features, there is illustrated in FIG. 1 a carrying machine 100 in the embodiment of a backhoe loader equipped with a hydraulic hammer 102. To physically transport the hydraulic hammer 102 about a worksite, the carrying machine 100 as a backhoe loader can include a machine frame 104 that is supported on a plurality of propulsion devices like wheels or, in other embodiments, continuous tracks. To power the carrying machine 100, the machine frame 104 may also include an engine compartment 106 inside of which is accommodated an internal combustion engine or another type of power plant and associated powertrain components. To accommodate an operator, there may be disposed on the machine frame 104 an operator's station or operator cab 108. It should be appreciated, that while the disclosure is described with respect to a backhoe loader, aspects of disclosure will be applicable to other types of mobile carrying machines such as excavators, skid loaders and the like. Moreover, the disclosure is not limited to hydraulic hammers 102 coupled to mobile machines but may apply to fixed and stationary applications.

To support and maneuver the hydraulic hammer 102, the carrying machine 100 can include an articulating arm 120 or a related mechanical linkage. The articulating arm 120 has a first link referred to as a boom 122 pivotally attached at one end to the machine frame 104 and a second link referred to as a dipper-stick 124 joined at a hinge 126 to the opposite end of the boom 122. To cause articulation of the boom 122 and dipper-stick 124, the articulating arm 120 may be operatively associated with one or more actuators in the embodiment of hydraulic cylinders 128. The hydraulic cylinders 128 can telescopically extend and retract to articulate the articulating arm 120 with respect to the hinge 126 and thereby raise, lower, and swing the hydraulic hammer 102. To provide pressurized hydraulic fluid to the hydraulic cylinders 128, the carrying machine 100 can be operatively associated with a hydraulic system that includes hydraulic pumps, filters, conduits, and associated hydraulic equipment. The hydraulic system may also supply pressurized hydraulic fluid for the hydraulic hammer.

To fracture and break apart material at the worksite, the hydraulic hammer 102 can include a hammer body or hammer shell 130 and a work tool 132 that partially protrudes from and is extendable and retractable with respect to the hammer shell 130. The hammer shell 130 can include a front head 134 from which the work tool 132 protrudes, a back head 136 that couples and attaches to the distal end of the dipper-stick 124, and a cylinder body 138 that extends between the front head 134 and the back head 136. As used herein, terms of orientation such as "front" or "forward" in relation to the front head 134 and "back" or "rearward" in relation to the back head 136 are for reference purposes only and do not form a limitation on the disclosure. The hammer shell 130 also houses and accommodates the actuating equipment and devices that forcibly reciprocates the work tool 132 with respect to the hammer shell 130. To impact and penetrate a work object about the worksite, the work tool 132 in various embodiments can be embodied as a pick or a chisel bit.

Figure 2:
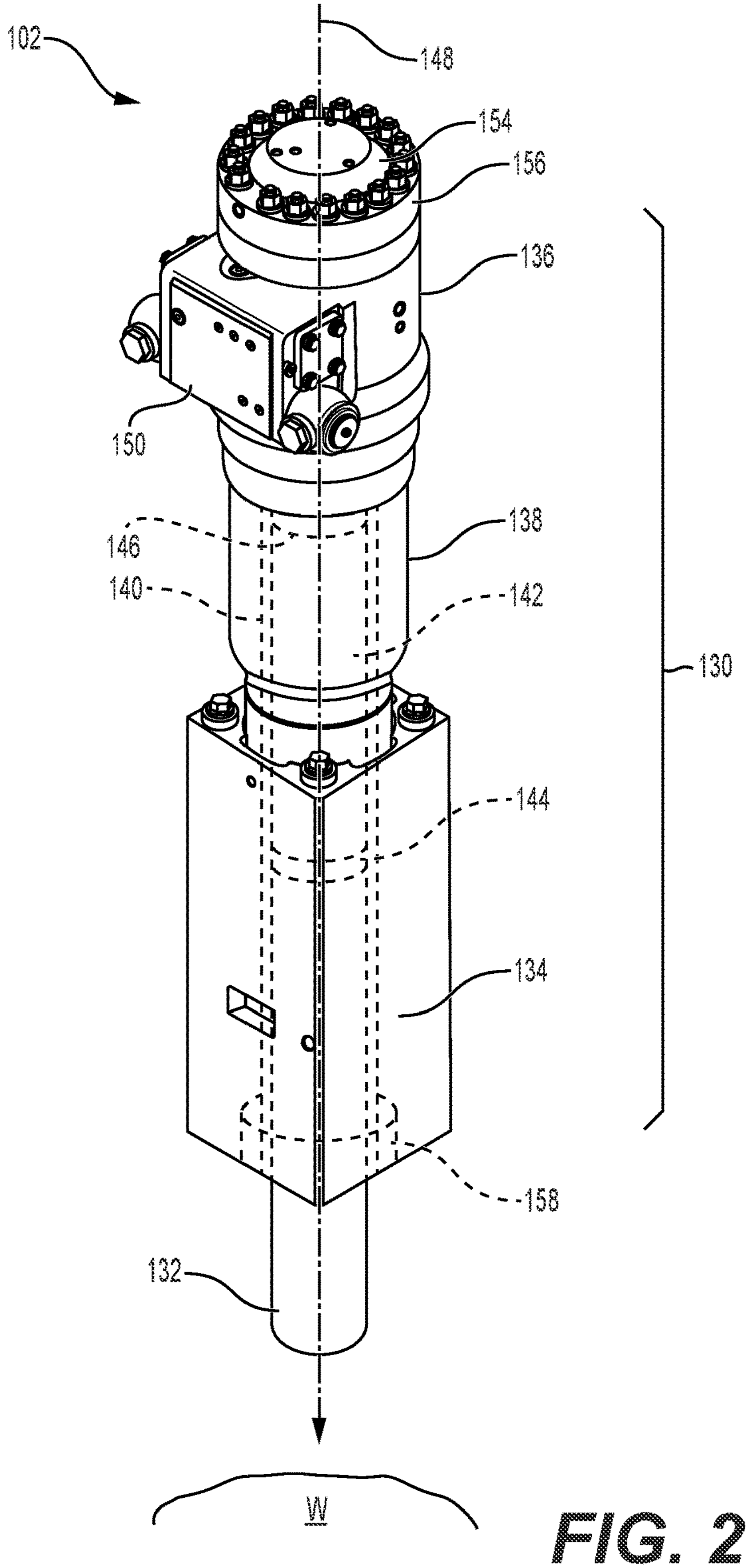
FIG. 2 is a perspective view of the hydraulic hammer that converts the pressurized flow of hydraulic fluid to the reciprocal movement of a work tool.

Referring to FIG. 2, the cylinder body 138 can be formed and shaped as a circular cylinder that defines a cylinder bore 140 inside of which is accommodated a piston 142. The piston 142 can have an elongated rod-like shape and can extend between a first or forward piston end 144 generally disposed in the cylinder body 138 and a second or rearward piston end 146 generally disposed within the back head 136. The forward piston end 144 can abut the work tool 132 disposed within the front head 134 of the hammer shell 130. The piston 142 can be complementary in shape and dimension to the cylinder bore 140 and can be reciprocally movable within the cylinder bore 142 along a hammer axis 148 that corresponds to the axis line of the hydraulic hammer. The hammer axis 148 may extend axially through the hammer shell 130 such that the front head 134 and the back head 136 are located at opposite axial ends of the hydraulic hammer 102.

To cause reciprocal motion of the piston 142 and thereby the work tool 132 along the hammer axis 148, the back head 136 can include hydraulic couplings 150 with inlet and outlet ports to receive and/or discharge pressurized hydraulic fluid from, for example, the carrying machine. To dampen the forces associated with the axial reciprocal motion of the piston 142 and the abutting work tool 132 along the hammer axis 148, there can be an accumulator head 154 attached at the axial rear end 156 of the back head 136. The front head 134 may include internal bushings 158 and seals disposed around and slidable with respect to the piston 142 to seal the cylinder bore 140.

Figure 3:
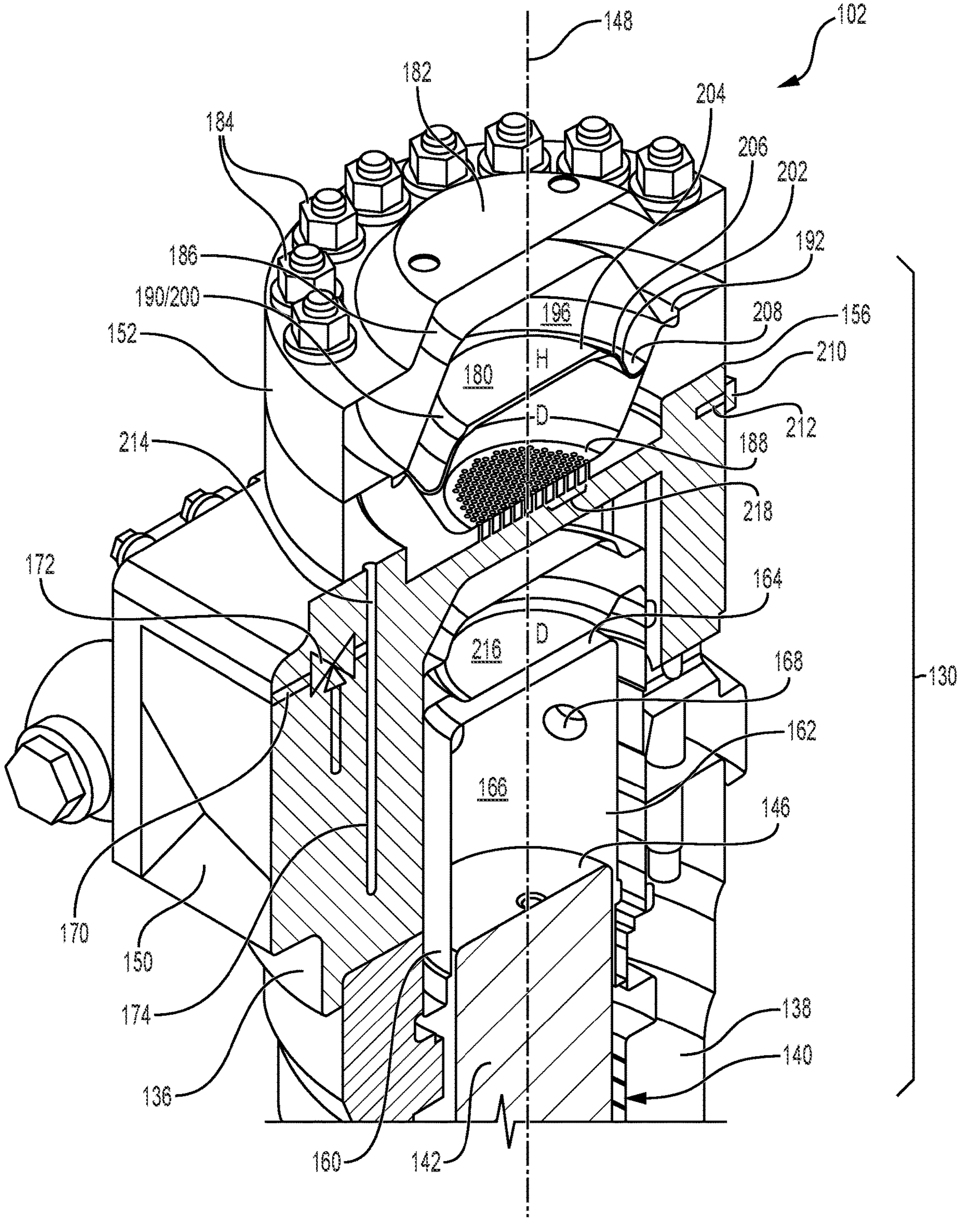
FIG. 3 is a perspective cross-sectional view of the hydraulic hammer including a back head and an accumulator head that includes an accumulator chamber separated by a membrane into sub-chambers arranged to advantageously utilize the working fluids associated with the hammer.
Figure 4:
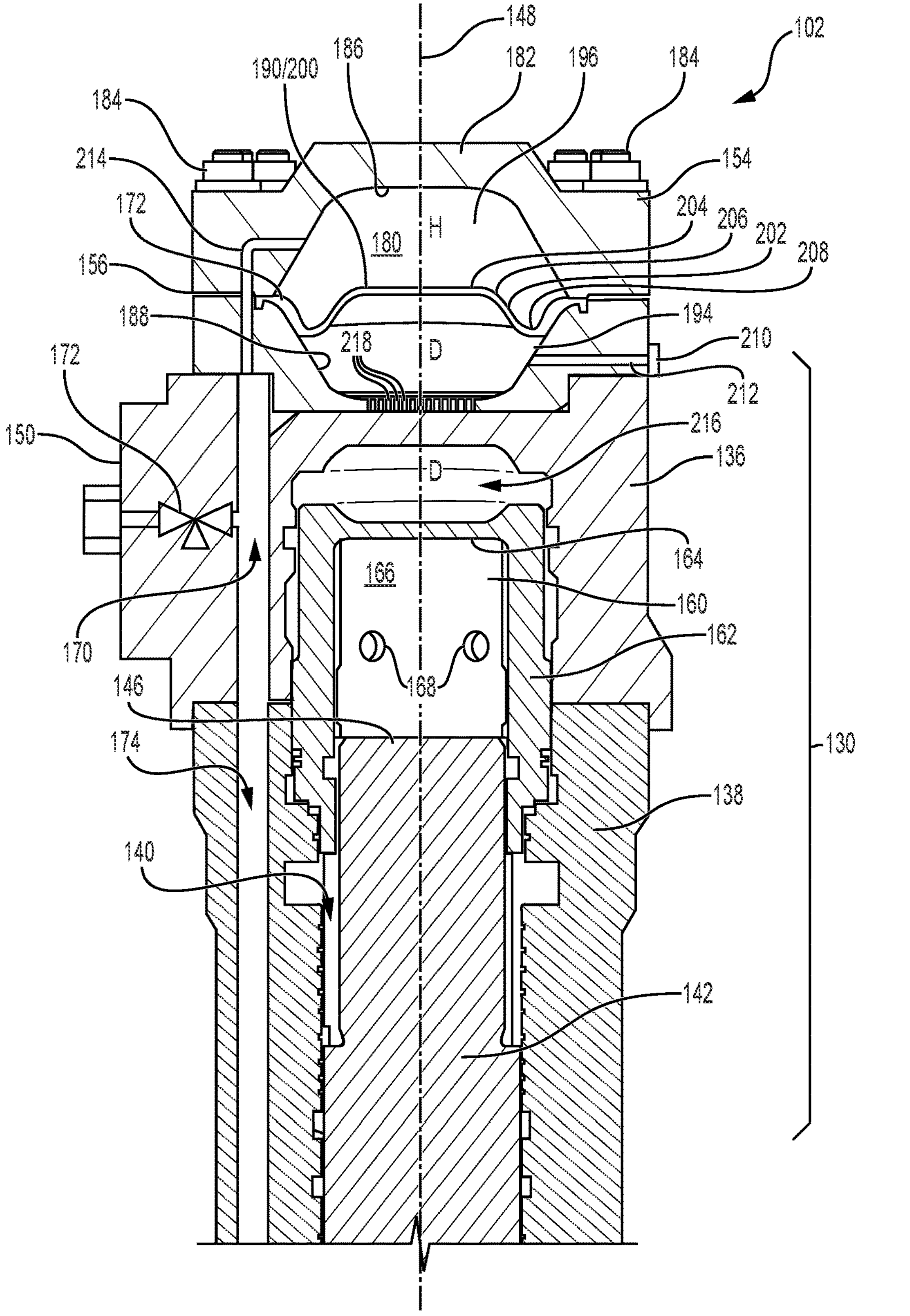
FIG. 4 is a side elevational cross-sectional view of the back head and the accumulator head arranged for direct fluid communication between a dampening sub-chamber disposed in the accumulator head and an internal dampening reservoir disposed in the back head.

Referring to FIGS. 3 and 4, there is an embodiment of the internal arrangement of the back head 136 and the upper portion of the cylinder body 138 of hydraulic hammer 102. As stated, the piston 142 has a rod-like shape including the rearward piston end 146 that is disposed within the back head 136. To receive and accommodate the rearward piston end 146 of the reciprocally movable piston 142, there can be disposed within the back head 136 a seal carrier 160. The seal carrier 160 can have a cap-like structure or shape including a cylindrical carrier wall 162 and an axial carrier end face 164. The cap-like structure or shape of the seal carrier 160 defines a piston-receiving volume 166 that is complementary in shape and dimension to the rearward piston end 146 and that can slideably receive the rearward piston end 146. Fluid communication with the piston-receiving volume 166 is established by a plurality of carrier fluid ports 168 disposed through the cylindrical carrier wall 162. The seal carrier 160 can also be disposed in fluid communication with the cylinder bore 140 and is similarly concentrically disposed with respect to the hammer axis 148.

In an embodiment, the seal carrier 160 can be reciprocally moveable within the back head 136 with respect to the hammer axis 148. In this embodiment, the outer diameter of the cylindrical carrier wall 162 can be dimension with respect to the diameter of the concentric cylinder bore 140 to allow for limited axially displacement of the seal carrier 160 to accommodate the larger axial displacement of the reciprocating piston 142.

Also disposed within the back head 136 can be a plurality of internal hydraulic fluid passages 170 and one or more diverter valves 172 that channel the pressurized hydraulic fluid with respect to the piston 142 causing reciprocal motion along the hammer axis 148. FIG. 4 illustrates and exemplary arrangement of the hydraulic fluid channels 170 and diverter valves 172, although the disclosure is not limited to any particular arrangement and is applicable to more complex and compete arrangements of channels and valves. By way of example, the hydraulic fluid channels 170 can be in direct or indirect fluid communication with the hydraulic couplings 150 located externally of the back head 136 to receive and/or discharge pressurized hydraulic fluid. In an example, the diverter valve 172 can be a 3-way valve (indicated symbolically) that can selectively divert hydraulic fluid to different locations. For example, the diverter valve 172 may selectively divert inflowing pressurized hydraulic fluid between the carrier fluid ports 168 of the seal carrier 160 and a retraction channel 174 that is axially disposed through the back head 136 and the cylinder body 138 and that is parallel to and offset from the cylinder bore 140 and the piston 142 therein.

During a hydraulic hammering operation, to retract the piston 142 axially rearward along the hammer axis 148 so that the rearward piston end 146 is received into the piston-receiving volume 166 of the seal carrier 160, the diverter valve 172 can be configured to direct hydraulic fluid to the retraction channel 174. The retraction channel 174 can be in fluid communication with the cylinder bore 140 at an axially forward location with respect to the back head 136 and the seal carrier 160 such that pressurized hydraulic fluid entering the cylinder bore 140 displaces the piston 142 upward within the hammer shell 130. To extend the piston 142 axially forward along the hammer axis 148 and discharge the rearward piston end 146 from the piston-receiving volume 166, the diverter valve 172 can be configured to direct pressurized hydraulic fluid to the carrier fluid port 168 in the seal carrier 160. The accumulation of pressurized hydraulic fluid within the piston-receiving volume 166 forces the piston 142, and thus the abutting work tool, forward with respect to the hammer shell 130 and thus performs an impact hammering operation.

It can be appreciated that extension and retraction of the piston reciprocally along the hammer axis 148 will generate momentum forces parallel with the hammer axis 148 tending to movably shake or vibrate the hydraulic hammer 102. Likewise, upon impact of the work tool with a work object, impact forces will be transferred or propagate through the piston 142 and the hammer shell 130 parallel with the hammer axis 148. Accordingly, in an embodiment, the accumulator head 154 located axially rearward of the back head 136 can be configured to dampen or dissipate the momentum and impact forces generated by operation of the hydraulic hammer.

For example, the accumulator head 154 can be configured to utilize the pressurized hydraulic fluid and a second dampening fluid that can readily flow and displace to absorbingly accommodate the momentum and impact forces. In an embodiment, the accumulator head 154 can define therein an accumulator chamber 180 that can be a hollow, opened volume for receiving fluid. In a particular embodiment, to define the accumulator chamber 180, the accumulator head 154 can include an accumulator shell 182 made from a rigid material such as structural steel and that can be attached to the axial rear end 156 of the back head 136 via threaded fasteners 184 such as bolts or, in other embodiments, the accumulator shell 182 may be welded to the back head 136. The accumulator shell 182 can be shaped to define a first internal accumulator cavity 186. In correspondence with the accumulator shell 182, the axial rear end 156 of the back head 136 can also be configured to define a second internal accumulator cavity 188. In an further embodiment, the first and second internal accumulator cavities 186, 188 can have opposing dome-like or frustoconical shapes and the accumulator chamber 180 can be generally circular with varying diameters that taper or increase and decrease along the hammer axis 148.

To separately accommodate the hydraulic fluid H and the second dampening fluid D, a flexible diaphragm or membrane 190 can be located in the accumulator chamber 180. The membrane 190 can be made from a sheet of flexible or pliable material such as rubber or flexible thermoplastic and can have a thin, disk-like shape. The membrane 190 can be circular in shape to correspond to the circular cross section of the accumulator chamber 180. To support the membrane 190 within the accumulator chamber 180, the circular peripheral rim 192 of the membrane 190 can be clamped or sandwiched between the axial rear end 156 of the back head 136 and the accumulator shell 182 when fastened thereon.

The membrane 190 can be generally normal to the hammer axis 148 and therefore serves as a barrier that separates the accumulator chamber 180 into a first sub-chamber 194, hereinafter referred to as the dampening sub-chamber, and a second sub-chamber 196, hereafter designated as the hydraulic sub-chamber. The dampening sub-chamber accommodates a dampening fluid D and the hydraulic sub-chamber accommodates pressurized hydraulic fluid H that may be supplied from the hydraulic couplings 150 on the back head 136. The dampening sub-chamber 194 and the hydraulic sub-chamber 196 can assume the frustoconical or dome-like shape of the first and second internal cavities 186 with which they are associated. With respect to the hammer axis 148 and the membrane 190 oriented normally thereto, the dampening sub-chamber 194 can be disposed axially forward of the hydraulic sub-chamber 196. In a structural sense, the dampening sub-chamber 194 can be defined in close proximity by or within the back head 136 and the hydraulic sub-chamber 196 can be defined by or within the accumulator shell 182 located axially rearward of the back head 136.

The flexible characteristic of the membrane 190 can allow the membrane to displace into either the dampening sub-chamber 194 or the hydraulic sub-chamber 196 depending upon pressure differences between the sub-chambers. In an embodiment, the membrane 190 can be configured as a rolling diaphragm 200. A rolling diaphragm 200 has a diameter larger than the bore in which it is secured and includes a flexible, rolling flange 202 that extends between a planar head portion 204 and the peripheral rim 192 of the membrane 190. The rolling flange 202 can deviate in direction from the planar head portion 204 and is joined to the head portion by a head radius 206. The rolling flange 202 can be connected to the peripheral rim 192 of the membrane at a second flange radius 208. To accommodate movement of the membrane 190 into the dampening sub-chamber 194 and the hydraulic sub-chamber 196, the rolling flange 202 can flexibly translate by folding upon itself generally between the head radius 206 and the flange radius 208 allowing adjustment of the distance between the planar head portion 204 and the peripheral rim 192 of the membrane 190. In other embodiments, the membrane 190 may be a substantially flat, flexible sheet or may have any other suitable shape.

To receive dampening fluid D, the dampening sub-chamber 194 can fluidly communicate with an externally located dampening fluid port 210 via a dampening fluid passage 212 disposed through the material of the back head 136. The dampening fluid D can be any suitable compressible dampening liquid or gas and, in an embodiment, may be gaseous nitrogen. The dampening fluid D can be accommodated in the dampening sub-chamber at a suitable precharged pressure such as, for example, 40 to 60 bars.

To receive the hydraulic fluid H, the hydraulic sub-chamber 196 can be in fluid communication with the hydraulic fluid channels 170 disposed in the hammer shell 130. In an embodiment, the hydraulic sub-chamber 196 can be fluidly associated with a hydraulic sub-chamber channel 214 disposed through the back head 136 and the accumulator shell 182 to establish fluid communication with the retraction channel 174 downstream of the diverter valve 172. The hydraulic sub-chamber 196 can therefore be at a pressure equilibrium with the cylinder bore 142 in which the piston 142 is reciprocally and slidably disposed. The hydraulic sub-chamber 196 can thereby also received pressurized hydraulic fluid H from the hydraulic system associated with the carrying machine via the hydraulic couplings 150 located externally of the back head 136.

In an embodiment, the back head 136 can include an internal dampening fluid reservoir 216 located therein. The internal dampening fluid reservoir 216 can be generally axially aligned with and rearward of the seal carrier 160 and can be defined between the axial carrier end face 164 and the axial rear end 156 of the back head 136. The internal dampening fluid reservoir 216 can be formed as part of the cylinder bore 140 and can be separated with respect to the remainder of the cylinder bore 140 by the seal carrier 160. With respect to the hammer axis 148, in orientation the internal dampening fluid reservoir 216 is axially rearward of the seal carrier 160 and axially forward of the accumulator chamber 180.

To receive dampening fluid D, the internal dampening fluid reservoir 216 can directly fluidly communicate with the dampening sub-chamber 194 via a plurality of dampening fluid apertures 218 disposed through the second internal accumulator cavity 188 and the axial rear end 156 of the back head 136. As used herein, direct fluid communication means that dampening fluid D flows directly between the internal dampening fluid reservoir 216 and the dampening sub-chamber 194 without being channeled through elongated or tortious channels or passages. The dampening sub-chamber 194 and the internal dampening fluid reservoir 216 are, in the present embodiment, effectively the same unitary volume in which dampening fluid D freely flows between there between via the a plurality of dampening fluid apertures 218.

An advantage of placing the dampening sub-chamber 194 and the internal dampening fluid reservoir 216 in an axially adjacent, close coupled arrangement so that dampening fluid D can directly flow between the two structures is that the overall height of the hydraulic hammer can be reduced and the need for lengthy and/or tortious internal fluid channels to direct dampening fluid between the two structures is eliminated. Further, the internal dampening fluid reservoir 216 is in fluid communication with the dampening fluid port 210 through the dampening sub-chamber 194 such that only a single dampening fluid port is needed to charge the hydraulic hammer with pressurized dampening fluid.

INDUSTRIAL APPLICABILITY

Referring to FIGS. 3 and 4 and with continued reference to all FIGS., in operation when the piston 142 is extended with respect to the cylinder bore 140 to cause the work tool 132 to strike and impact a work object, the impact forces may be transferred rearwardly with respect to the hammer axis 148. The impact forces may tend to displace upwardly the seal carrier 160 movably disposed in the cylinder bore 140. The axial carrier end face 164 therefore compresses the dampening fluid D in the internal dampening fluid reservoir 216 which exerts and opposing counterforce to the impact forces. The dampening fluid D therefore absorbs and/or dissipates the impact forces.

Moreover, the dampening fluid D in the internal dampening fluid reservoir 216 can be displaced into the dampening sub-chamber 194 via the plurality of dampening fluid apertures 218 if the opposing counterforces are less than that the magnitude of the impact force and insufficient to resist movement of the seal carrier 160. In the event the dampening fluid D is displaced into the dampening sub-chamber 194 from the internal dampening fluid reservoir 216, pressurized hydraulic fluid H can be discharged from the hydraulic sub-chamber 196 by flexible movement of the membrane 190 and can flow to the hydraulic fluid channels 170 via the hydraulic sub-chamber channel 214.

Conversely, when the piston 142 is axially retracted into the cylinder bore 140, momentum forces may be directed parallel to the hammer axis 148 toward the seal carrier 160 causing the seal carrier to press upon the internal dampening fluid reservoir 216. The dampening fluid D in the internal dampening fluid reservoir 216 can again resist the further transfer of momentum forces and can displace into the dampening sub-chamber 194 if necessary. Pressurized hydraulic fluid H in the oppositely situated hydraulic sub-chamber 196 will oppose, by exerting pressure against the membrane 190, further displacement of dampening fluid D into the dampening fluid sub-chamber.

Hence, the opposing pressure forces of the hydraulic fluid H in the hydraulic sub-chamber 196 and the dampening fluid D in the dampening sub-chamber 194 can balance, oppose, dissipate, and reduce the momentum and impact forces in the hydraulic hammer 102.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A hydraulic hammer comprising:

a cylinder body disposed between a back head and a front head and defining in part a cylinder bore extending along a hammer axis;

a piston reciprocally disposed within the cylinder bore for reciprocal movement along the hammer axis, the piston including a first piston end and a second piston end;

a seal carrier disposed in the back head and configured to receive the second piston end upon reciprocal movement of the piston along the hammer axis; and an accumulator head disposed on an axial rear end of the back head, the accumulator head defining an accumulator chamber with a membrane disposed therein separating the accumulator chamber between a hydraulic sub-chamber for accommodating a hydraulic fluid and a dampening sub-chamber for accommodating a dampening fluid, wherein the dampening sub-chamber is axially proximate to the back head.

2. The hydraulic hammer of claim 1, wherein the membrane is generally disposed normal to the hammer axis.

3. The hydraulic hammer of claim 2, wherein the back head has disposed therein an internal dampening fluid reservoir located axially between the seal carrier and the axial rear end of the back head.

4. The hydraulic hammer of claim 3, wherein an internal dampening fluid reservoir in fluid communication with the dampening sub-chamber.

5. The hydraulic hammer of claim 4, wherein the internal dampening fluid reservoir and the dampening sub-chamber are in fluid communication with a dampening fluid port located externally of the back head.

6. The hydraulic hammer of claim 5, wherein the seal carrier is adapted for axial movement within the cylinder bore to displace with respect to the internal dampening fluid reservoir.

7. The hydraulic hammer of claim 6, wherein the seal carrier has a cap-like shape including a cylindrical carrier wall and an axial carrier end face.

8. The hydraulic hammer of claim 1, wherein the hydraulic sub-chamber is in fluid communication with a plurality of hydraulic fluid channels that are in fluid communication with the cylinder bore.

9. The hydraulic hammer of claim 1, wherein the membrane is configured as a rolling diaphragm.

10. The hydraulic hammer of claim 1, wherein the dampening sub-chamber and the hydraulic sub-chamber have opposing frustoconical shapes.

11. A hydraulic hammer comprising:

a cylinder body disposed between a back head and a front head and defining in part a cylinder bore extending along a hammer axis;

a piston reciprocally disposed within the cylinder bore for reciprocal movement along the hammer axis, the piston including a first piston end and a second piston end;

an accumulator head disposed on an axial rear end of the back head, the accumulator head defining an accumulator chamber with a membrane disposed therein separating the accumulator chamber between a hydraulic sub-chamber for accommodating a hydraulic fluid and a dampening sub-chamber for accommodating a dampening fluid; and an internal dampening fluid reservoir disposed in the back head and in direct fluid communication with the dampening sub-chamber disposed in the accumulator head.

12. The hydraulic hammer of claim 11, wherein the internal dampening fluid reservoir and the dampening sub-chamber freely fluidly communicate through a plurality of damping fluid aperture.

13. The hydraulic hammer of claim 12, further comprising a seal carrier disposed in the back head and configured to receive the second piston end upon reciprocal movement of the piston along the hammer axis.

14. The hydraulic hammer of claim 13, wherein the internal dampening fluid reservoir is located between the seal carrier and the accumulator head.

15. The hydraulic hammer of claim 14, wherein the seal carrier is adapted for axial movement within the cylinder bore to displace with respect to the internal dampening fluid reservoir.

16. The hydraulic hammer of claim 15, wherein the seal carrier has a cap-like shape including a cylindrical carrier wall and an axial carrier end face.

17. The hydraulic hammer of claim 11, wherein the internal dampening fluid reservoir and the dampening sub-chamber are in fluid communication with a dampening fluid port located externally of the back head.

18. The hydraulic hammer of claim 11, wherein the dampening sub-chamber and the hydraulic sub-chamber have opposing frustoconical shapes.

19. The hydraulic hammer of claim 11, wherein the membrane is a rolling diaphragm.

* * * * *